US009790856B2

(12) United States Patent
Trohel

(10) Patent No.: US 9,790,856 B2
(45) Date of Patent: Oct. 17, 2017

(54) JET PUMP FOR DEPRESSURIZING LUBRICATION CHAMBERS OF A TURBOMACHINE, HAVING INDEPENDENT DOUBLE INJECTORS

(71) Applicant: SNECMA, Paris (FR)

(72) Inventor: Mathieu Trohel, Moissy-cramayel (FR)

(73) Assignee: SNECMA, Paris (FR)

( * ) Notice: Subject to any disclaimer, the term of this patent is extended or adjusted under 35 U.S.C. 154(b) by 421 days.

(21) Appl. No.: 14/435,737

(22) PCT Filed: Oct. 19, 2012

(86) PCT No.: PCT/FR2012/052401
§ 371 (c)(1),
(2) Date: Apr. 14, 2015

(87) PCT Pub. No.: WO2014/060656
PCT Pub. Date: Apr. 24, 2014

(65) Prior Publication Data
US 2015/0260100 A1 Sep. 17, 2015

(51) Int. Cl.
*F02C 7/06* (2006.01)
*F01D 25/20* (2006.01)
(Continued)

(52) U.S. Cl.
CPC .............. *F02C 7/06* (2013.01); *F01D 25/20* (2013.01); *F04F 5/02* (2013.01); *F04F 5/46* (2013.01);
(Continued)

(58) Field of Classification Search
CPC ...... F01D 25/16; F01D 25/162; F01D 25/166; F01D 25/18; F01D 25/183; F01D 25/186; F01D 25/20; F01D 25/22
(Continued)

(56) References Cited

U.S. PATENT DOCUMENTS 2,571,166 A 11/1948 Rossetto
4,037,991 A 7/1977 Taylor
(Continued)

FOREIGN PATENT DOCUMENTS

EP 0 626 503 A1 11/1994
EP 1 972 796 A1 9/2008
(Continued)

OTHER PUBLICATIONS

Comments made in response to the International Search Report for PCT/FR2012/052401, 2 pages.

*Primary Examiner* — Binh Q Tran
(74) *Attorney, Agent, or Firm* — Blakely Sokoloff Taylor & Zafman LLP

(57) ABSTRACT

Device for depressurizing at least one chamber (E1, E2) of a turbomachine (1) intended to accommodate at least one bearing (7, 8) of a rotor of said turbomachine, which bearing is supplied with lubricating oil under pressure by a feed pump (15) and by an oil feed duct (16), said device comprising at least one breather tube (10) connected to said chamber in order to extract an oil mist therefrom, an oil separator (30) able to separate the oil from the air in said mist and a jet pump (11) pneumatically connected to said chamber by said breather tube and said oil separator, said pump comprising a pump tube (17) into which there open a primary circuit (21) supplied with fluid under pressure via a fluid feed duct and a secondary circuit (22) connected to said oil separator in order to place the chamber under a reduced pressure, characterized in that the primary circuit (21) comprises at least two pressurized-fluid injectors (13, 24) positioned in said tube and fed independently of one another.

7 Claims, 4 Drawing Sheets

(51) Int. Cl.
*F04F 5/02* (2006.01)
*F04F 5/46* (2006.01)

(52) U.S. Cl.
CPC .... *F05D 2240/50* (2013.01); *F05D 2260/601* (2013.01); *F05D 2260/602* (2013.01)

(58) Field of Classification Search
USPC ... 60/605.3, 39.08, 657, 339, 396, 452–456, 60/714
See application file for complete search history.

(56) References Cited

U.S. PATENT DOCUMENTS

| | | | | |
|---|---|---|---|---|
| 7,174,997 | B2* | 2/2007 | Sheridan | F01D 25/16 184/55.1 |
| 7,748,209 | B1* | 7/2010 | Schopf | F01D 5/082 60/39.08 |
| 8,915,991 | B2* | 12/2014 | Foster | F01D 25/16 55/404 |
| 9,341,117 | B2* | 5/2016 | Remer | F02C 7/06 |
| 2011/0198155 | A1* | 8/2011 | Charier | F01D 25/125 184/6.23 |
| 2013/0177398 | A1* | 7/2013 | Dos Santos | F01D 11/04 415/116 |

FOREIGN PATENT DOCUMENTS

| | | |
|---|---|---|
| FR | 2 961 856 | 12/2011 |
| WO | WO 01/78884 A1 | 10/2001 |

\* cited by examiner

A - A

JET PUMP FOR DEPRESSURIZING LUBRICATION CHAMBERS OF A TURBOMACHINE, HAVING INDEPENDENT DOUBLE INJECTORS

The field of the present invention is that of turbine engines and, more particularly, that of oil chambers comprising bearings carrying the rotors of these turbine engines.

A turbine engine for an aircraft generally comprises, from upstream to downstream in the direction of flow of the gases, a fan, one or more compressor stages, for example a low-pressure compressor and a high-pressure compressor, a combustion chamber, one or more turbine stages, for example a high-pressure turbine and a low-pressure turbine, and a gas exhaust pipe. A turbine can correspond to each compressor, the two being connected by a shaft, thus forming, for example, a high-pressure body and a low-pressure body.

It generally has two structural casings, a casing known as an intermediate case towards the front and a casing known as an exhaust case towards the rear, which carry the bearings on which its rotary shaft or shafts and its moving parts turn. These bearings are conventionally cooled, using judiciously-positioned injectors, by oil which lubricates them and which is recovered in an appropriate reservoir and then recycled. The bearings and the various gear units of the engine are generally placed in a chamber, which must be sealed in relation to the stream of air in order to avoid oil loss. The engine thus comprises, for example, an upstream chamber at the intermediate case and a downstream chamber at the exhaust case.

In order to prevent leakages of oil through the seals at the connectors of the chambers, a difference in pressure relative to the surrounding cavities must be provided and a minimum value of this pressure difference must therefore be maintained at all speeds of operation of the turbine engine. The surrounding cavities are pressurised by air coming from one of the stages of a compressor, which circulates inside the engine in order to balance its internal pressures and to cool the hot parts. As the pressure of this air varies according to the speed of the engine, it may be necessary, in order to ensure a positive pressure difference at the connectors of the chambers, to depressurise them. To provide this depressurisation of the chambers enclosing the bearings, jet pump systems can be used, the secondary circuit of which is connected to these chambers. These systems operate on the principle of the Venturi effect, which creates a fall in pressure in a pipe by sending a jet of fluid under pressure in a circuit, known as the primary circuit, through this pipe. This fluid under pressure can be air that is taken from a stage of the high-pressure (HP) compressor or oil as described in the applicant's patent application, filed on 25 Jun. 2010 under the number FR 1055127.

However, it happens, particularly at idling speed, that the pressure delivered is insufficient to provide a correct reduction in pressure. This is because a jet pump with a primary injector sized in order to operate at idling speed would result in having a jet pump that was oversized for full-out operation. In addition, as the jet pump was not sized for full-out operation, its efficiency would not be optimal and the primary flow removed at full-out operation would be too high relative to the requirement adapted to full-out operation. It is therefore preferable, in order to adjust the reduction in pressure of the chambers as well as possible, to cause the power of the jet pump to vary according to the engine speed. A current solution for this consists in regulating the primary flow of the jet pump with the aid of a regulated valve. However, this solution has several disadvantages. Firstly, it involves the use of a regulated valve which is more costly and more complex than a two-position valve. Furthermore, the efficiency of the jet pump will not be optimised because the section of the primary injector will not be adapted for the different speeds of operation.

The object of the present invention is to remedy these disadvantages by proposing a simple device for depressurising bearing chambers, which has maximum efficiency at all speeds of operation of the turbine engine.

For this purpose, the subject matter of the invention is a device for depressurising at least one chamber of a turbine engine intended to accommodate at least one bearing of a rotor of said turbine engine, said bearing being supplied with lubricating oil under pressure by a supply pump and by an oil supply pipe, and said device comprising at least one breather tube connected to said chamber in order to extract a mist of oil therefrom, an air-oil separator capable of separating the oil from the air in said mist and a jet pump connected pneumatically to said chamber by said breather tube and said air-oil separator, said pump comprising a pump tube into which there open a primary circuit supplied with a fluid under pressure by a fluid supply pipe and a secondary circuit connected to said air-oil separator in order to depressurise the chamber, characterised in that the primary circuit comprises at least two pressurised-fluid injectors positioned in said pump tube and supplied independently of one another.

The presence of two independent injectors makes it possible, by supplying one or the other or both injectors, to vary the reduction in pressure in the chamber and thus to adjust that reduction in pressure to all flight speeds.

Advantageously, at least one of the injectors is supplied by a pipe that has a valve for adjusting the pressure of the flow that passes through it.

More advantageously, each injector is supplied by a pipe that has a valve. This gives greater flexibility in adjusting the reduction in pressure to the flight speed concerned.

Preferably, at least one of said valves is a two-position valve. In this way, an extremely simple and inexpensive embodiment of the invention is obtained.

In a first embodiment, the injectors are conical nozzles positioned at the extremity of their pressurised-fluid supply pipe.

Advantageously, the outlet diameters of the two nozzles are different.

In a second embodiment, the injectors are rails perforated by injection holes, extending radially across the pump tube.

In a particular embodiment, the injection holes of the rails are equal in number.

In an alternative embodiment, the total area of the injection holes is different between the rails.

The invention also relates to a turbine engine comprising a device for depressurising one of its bearing lubrication chambers as described above.

The invention will be better understood, and the other objects, details, features and advantages thereof will become more clearly apparent in the course of the detailed explanatory description that follows, of several embodiments of the invention given as purely illustrative and non-limiting examples, with reference to the accompanying schematic drawings.

Figure 1:
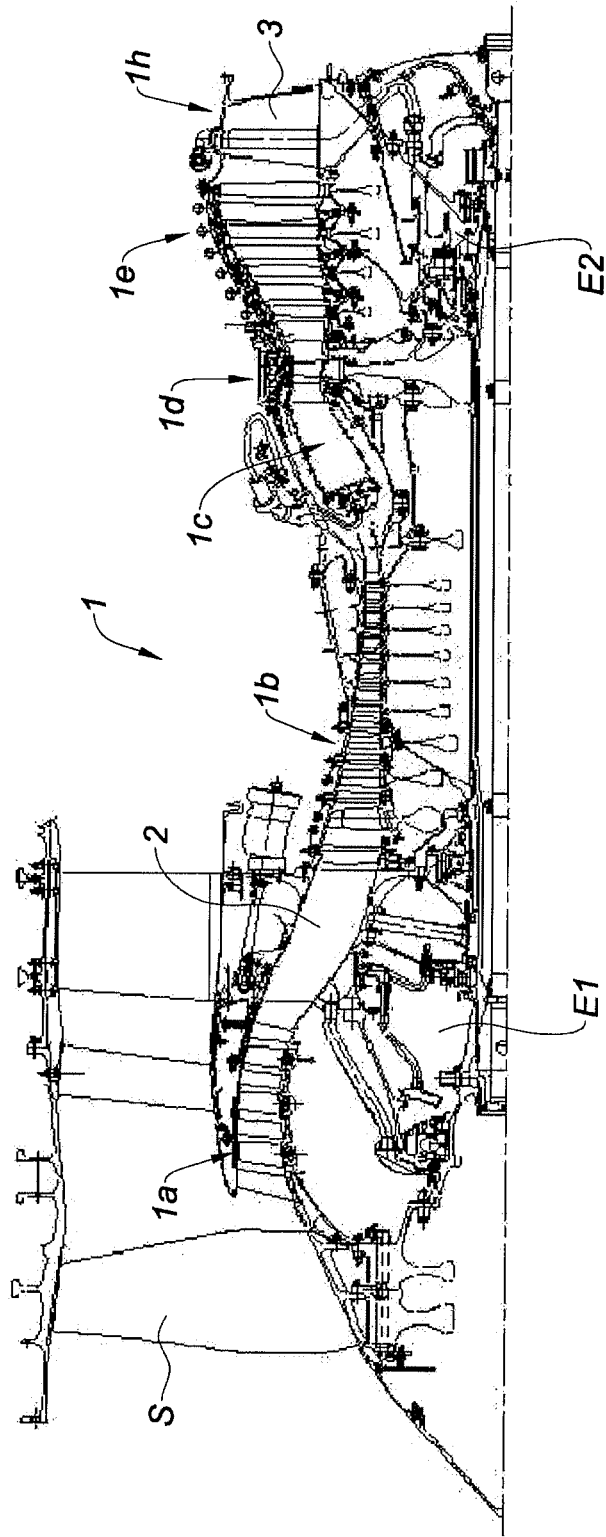
FIG. 1 is a general cross section of a turbine engine.

With reference to FIG. 1, there can be seen a turbojet engine 1 that comprises, conventionally, a fan S, a low-pressure compressor 1a, a high-pressure compressor 1b, a combustion chamber 1c, a high-pressure turbine 1d, a low-pressure turbine 1e and an exhaust pipe 1h. The high-pressure compressor 1b and the high-pressure turbine 1d are connected by a high-pressure shaft 4 and form with it a high-pressure (HP) body. The low-pressure compressor 1a and the low-pressure turbine 1e are connected by a low-pressure shaft 5 and form with it a low-pressure (LP) body.

The HP and LP shafts extend along an axis that is the axis of rotation of the turbojet engine 1 and in the remainder of the description, the concepts of longitudinal or radial are relative to this axis.

The turbine engine 1 also comprises, conventionally, an intermediate case 2 and an exhaust case 3 which support, amongst other items, the bearings of the LP and HP rotary shafts. These latter are enclosed respectively in an upstream chamber E1 attached to the intermediate case 2, for the bearings situated upstream of the HP body, and in a downstream chamber E2 attached to the exhaust case 3, for the bearings situated downstream of the HP body.

Figure 2:
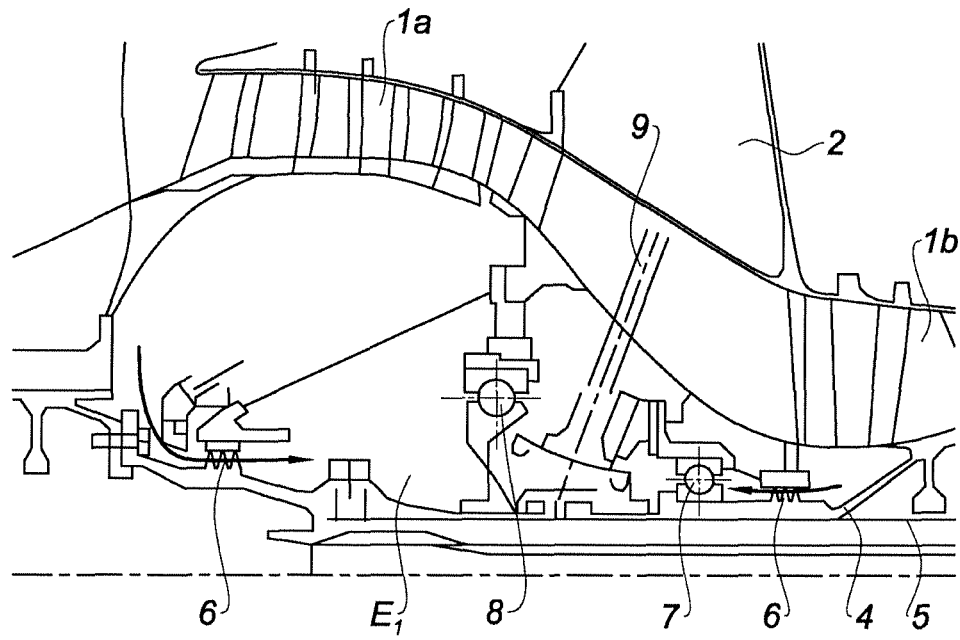
FIG. 2 is a cross section of the intermediate case of the turbine engine of FIG. 1.

FIG. 2 shows the front part of the turbine engine of FIG. 1, axially at the LP compressor 1a, and the upstream chamber E1. The intermediate case 2 extends in the direction of the axis of rotation through walls which form the fixed part of the chamber E1, while the HP shaft 4 and the LP shaft 5 form the turning part thereof. These two parts join together to form the chamber E1 at the labyrinths 6 which aim to reduce, as much as is possible, the flow of air entering this chamber. Arrows in the drawing indicate the direction of flow of the air that passes through the labyrinths 6.

The chamber E1, like the chamber E2 of the exhaust case, is connected to the exterior by a pipe, not shown in the drawing, known as the breather tube, through which is evacuated the air that has entered these chambers and that, at the outlet, is laden with a mist of oil.

Inside the chamber E1 there can be seen the thrust bearings and the bearings of the HP and LP shafts that carry them, referenced 7 and 8 respectively. FIG. 2 also shows a power take-off shaft 9 on the LP rotor 5, to which it is conventionally connected by pinions, the purpose of which is to drive the ancillary items functioning on the engine or to provide power to the items of equipment of the aircraft that require it.

Figure 3:
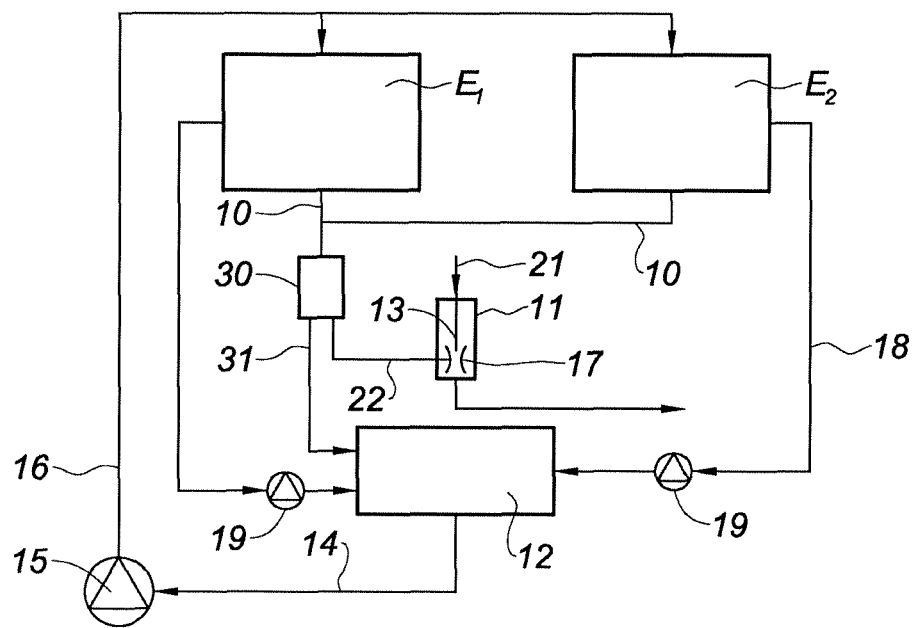
FIG. 3 is a schematic view of a device for depressurising the chambers for the turbine engine of FIG. 1.

With reference now to FIG. 3, there can be seen a conventional diagram of the flow of air that has entered the chambers E1 and E2 by the labyrinths 6 and a diagram of the flow of the lubrication oil. The breather tubes 10 of the two chambers E1 and E2 are connected to an air-oil separator 30 whose function is to separate the air from the oil, in the mist from the chambers. The recovered oil is sent directly to the oil reservoir 12 via an oil return pipe 31, while the de-oiled air is aspirated into the secondary circuit 22 of a jet pump 11.

A jet pump conventionally comprises a primary circuit 21, including a nozzle 13 leading longitudinally into a cylindrical tube, or preferably near the smallest-section part of a tube comprising a convergent-divergent assembly 17. A fluid under pressure is ejected by the primary circuit through the nozzle, so as to create a reduction in pressure at the secondary circuit. The secondary circuit of the pump is attached, at this smallest section, to the cavity that is to be depressurised. In the case of a turbine engine using a jet pump, the secondary circuit 22 is connected pneumatically to the air-oil separator 30, and through it to the chambers E1 and E2 by the breather tubes 10. This allows the pressure in the chambers to be reduced to ensure, firstly, sealing and, secondly, extraction of the mist of oil from the chambers E1 and E2. In order for the pump 11 to function, the primary circuit 21 is conventionally supplied with air from a stage of the HP compressor.

The lubricating oil circuit for the bearings and gear units present in the chambers E1 and E2 comprises, beginning from the reservoir 12, an outlet pipe 14 that leads into an oil supply pump 15 where its pressure is increased, and a distribution pipe 16 that leads into the chambers E1 and E2 at the spray nozzles which project oil under pressure onto the bearings and gear units to be lubricated. It also comprises an oil recovery circuit that collects the used oil and sends it back to the reservoir 12. As shown in FIG. 3, the used oil and the mist aspirated in the chambers E1 and E2 are conveyed by two different pipes. The breather tube 10, which is connected, at the outlet from the air-oil separator 30, to the secondary circuit 22 of the jet pump 11, recovers the mist aspirated in the chambers E1 and E2, whereas special recovery pipes 18 are put in place on these chambers to recover the used oil. Recovery pumps 19, which propel the recovered oil into the reservoir 12, are conventionally installed on these pipes. In a known manner, a radiator (not shown) is also placed on the circuit in order to cool the oil.

Figure 4:
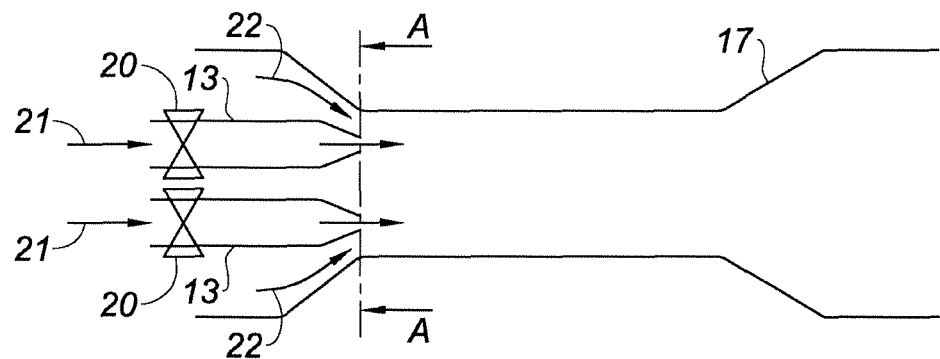
FIG. 4 is a cross section, from above, of a device for depressurising the chambers of the turbine engine of FIG. 1, according to a first embodiment of the invention.
Figure 5:
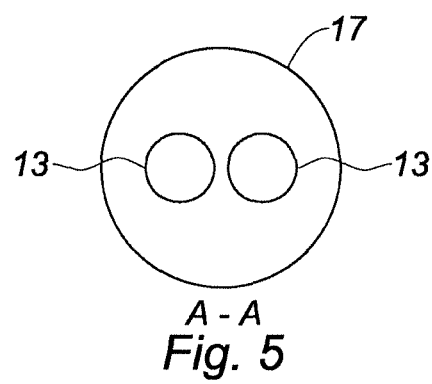
FIG. 5 is a side view in cross section of the device of FIG. 4.

FIGS. 4 and 5 show in cross section, respectively from above and as a side view, a jet pump according to a first embodiment of the invention.

The primary circuit 21 is supplied by two nozzles or injectors 13 that are positioned side by side and that lead into the tube, and in the case where a convergent-divergent assembly 17 is concerned, at its narrowest part. These injectors themselves have a cylindrical shape that ends in a conical part so as to reduce their cross section and, consequently, to increase the speed of the fluid in the primary circuit 21 when it is injected into the convergent-divergent assembly under the Venturi effect. The secondary circuit 22 is formed by the outer walls of the convergent-divergent assembly 17 and is connected to the air-oil separator 30 which receives, via the breather tubes 10, the mist of oil aspirated in the chambers E1 and E2 and which sends the de-oiled air towards the jet pump 11. In the embodiment shown, the injectors 13 are two in number, but the invention could equally well be embodied with a greater number of injectors, provided that these are supplied with a fluid under pressure.

Figure 6:
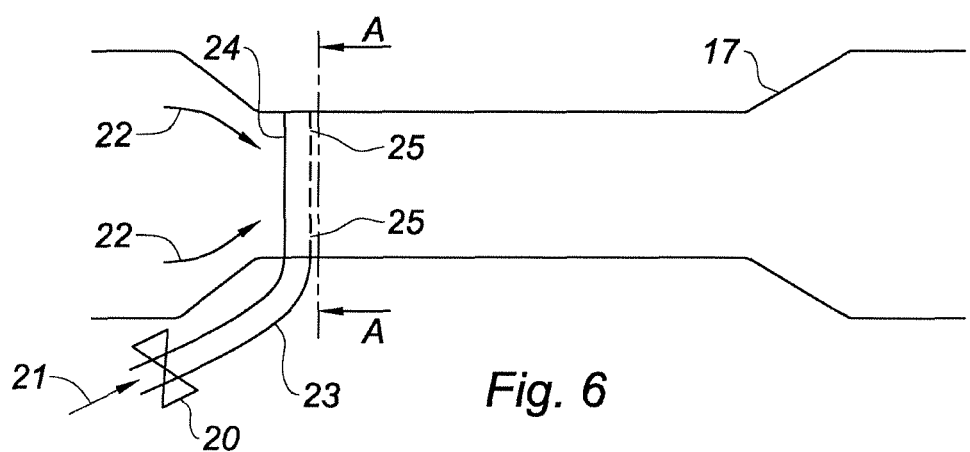
FIG. 6 is a front view in cross section of a device for depressurising the chambers of the turbine engine of FIG. 1, according to a second embodiment of the invention.
Figure 7:
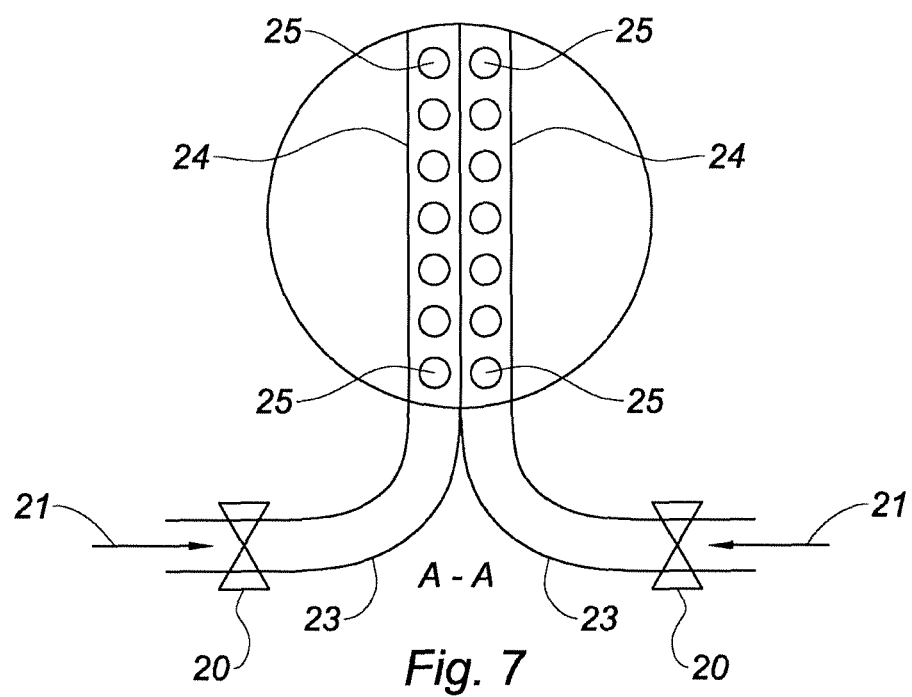
FIG. 7 is a side view in cross section of the device of FIG. 6.

With reference to FIGS. 6 and 7, a description will now be given of a second embodiment of the invention. Here, the injectors are embodied in the form of two parallel injection rails 24 which extend radially through the narrowed part of the convergent-divergent assembly 17. These rails are supplied with fluid from the primary circuit 21 by supply pipes 23 connected, like the injectors 13 in the first embodiment, to the generator circuit of said fluid under pressure, whether this is air that is taken from the HP compressor 1b or oil that is taken downstream of the supply pump 15. Each of the injection rails 24 is perforated by a plurality of injection holes 25, which are aligned with one another, along the length of the rail 24, and which diffuse the fluid from the primary circuit 21 in the direction of flow of the fluids in the Venturi, at the narrowed part of the convergent-divergent assembly 17. The secondary circuit 22 passes into the convergent-divergent assembly 17, bypassing the injection rails 24.

As in the first embodiment, the invention can equally well be embodied with a greater number of injection rails, provided that the injection holes thereof are supplied with a fluid under pressure. Likewise, the parallel arrangement of the two injection rails is not essential; it could be replaced by a configuration with two injection rails perpendicular to one another or again by a plurality of radial rails regularly distributed on the circumference of the tube. Any configuration having at least one injection rail, of which at least two holes 25 diffuse a fluid under pressure substantially along the axis of the convergent-divergent assembly 17, falls within the scope of the invention.

A description will now be given of the operation of the device for depressurising the chambers E1 and E2 according to the first embodiment. The operation of the device according to the second embodiment is identical.

In order to adjust the depressurisation of the chambers, the invention consists in using a jet pump with two injectors on the primary circuit 21, in which pump these two injectors are independent, in other words, they are both supplied with a fluid of which the pressure that passes through them can be regulated independently of one another. In order to do this, one or other or even both of the injectors are supplied by pipes to which are fitted valves 20 that make it possible to vary the pressure in one or in both injectors and thus to adjust the power of the jet pump according to need and, in particular, according to the engine speed. So as to simplify the embodiment of the device for controlling the pressure in the convergent-divergent assembly 17, the valve or valves 20 are preferably of a two-position type which makes it possible, by activating or deactivating one of the injectors, to regulate the power of the jet pump in an optimal manner. By supplying only one of the two injectors, or both of them simultaneously, it is possible to have a rate of flow that can run from single to double, in the case of identical injectors. In the case where the two injectors have different outlet diameters, three possible flow rate values can be obtained, depending on whether one, the other or both injectors are activated. One particular configuration, which has the advantage of great simplicity, consists in permanently supplying an injector, in other words, without installing a valve on its supply pipe, and of supplying or not supplying the second, depending on the engine speed, using a single two-position valve which is placed on the supply pipe of this second injector.

The same possibility exists in the case of the second embodiment, where the valves 20, which are placed on the supply pipes 23, allow one, the other or both injection rails to be supplied simultaneously. Just as the injectors in the first embodiment can have different diameters, the size or the number of injection holes 25 can vary from one rail to the other, thus giving multiple options for adjusting the power of the jet pump to the requirement. The second embodiment has been shown with a single two-position valve for each pipe 23 supplying fluid under pressure. It is also possible to provide individual pipes for each injection hole 25, on which specific two-position valves are installed, which multiplies the options for adjusting the power of the jet pump to each speed of the turbine engine.

The invention claimed is:

1. Device for depressurising at least one chamber of a turbine engine intended to accommodate at least one bearing of a rotor of said turbine engine, said bearing being supplied with lubricating oil under pressure by a supply pump and by an oil supply pipe, and said device comprising at least one breather tube connected to said chamber in order to extract a mist of oil therefrom, an air-oil separator capable of separating the oil from the air in said mist and a jet pump connected pneumatically to said chamber by said breather tube and said air-oil separator, said pump comprising a pump tube into which there open a primary circuit supplied with a fluid under pressure by a fluid supply pipe and a secondary circuit connected to said air-oil separator in order to depressurise the chamber, the primary circuit comprising at least two pressurised-fluid injectors positioned in said pump tube and supplied independently of one another, characterised in that the injectors are rails perforated by injection holes, extending radially across the pump tube.

2. Device according to claim 1, wherein at least one of the injectors is supplied by a pipe that has a valve for adjusting the pressure of the flow that passes through it.

3. Device according to claim 2, wherein each injector is supplied by a pipe that has a valve.

4. Device according to claim 2, wherein at least one of said valves is a two-position valve.

5. Device according to any of claim 1, wherein the injection holes of the rails are equal in number.

6. Turbine engine comprising a device for depressurising one of its bearing lubrication chambers according to claim 1.

7. Device according to any of claim 1, wherein the total area of the injection holes is different between the rails.

* * * * *